United States Patent

Prater et al.

(10) Patent No.: US 10,809,184 B1
(45) Date of Patent: Oct. 20, 2020

(54) METHOD AND APPARATUS FOR REDUCING NOISE IN SPECTROSCOPIC DATA AT A POINT ON A SAMPLE

(71) Applicant: Photothermal Spectroscopy Corp., Santa Barbara, CA (US)

(72) Inventors: Craig Prater, Santa Barbara, CA (US); Mustafa Kansiz, Santa Barbara, CA (US)

(73) Assignee: Photothermal Spectroscopy Corp., Santa Barbara, CA (US)

( * ) Notice: Subject to any disclaimer, the term of this patent is extended or adjusted under 35 U.S.C. 154(b) by 0 days.

(21) Appl. No.: 16/366,982

(22) Filed: Mar. 27, 2019

(51) Int. Cl.
*G01N 21/27* (2006.01)
*G01N 21/35* (2014.01)
*G01N 3/10* (2006.01)
*G06N 20/00* (2019.01)
*G01J 3/10* (2006.01)

(52) U.S. Cl.
CPC ............ *G01N 21/274* (2013.01); *G01J 3/108* (2013.01); *G01N 21/35* (2013.01); *G06N 20/00* (2019.01); *G01N 2021/3595* (2013.01)

(58) Field of Classification Search
CPC ....... G01J 3/108; G01N 21/274; G01N 21/35; G01N 2021/3595; G06N 20/00
See application file for complete search history.

(56) References Cited

U.S. PATENT DOCUMENTS

2015/0233762 A1* 8/2015 Goldring ............. G01N 21/255
  356/451
2019/0137337 A1* 5/2019 Ridder .................... G01J 3/10

OTHER PUBLICATIONS

Holschneider et al., "A Real-Time Algorithm for Signal Analysis with the Help of the Wavelet Transform," Time-Frequency Methods and Phase Space, pp. 289-297. Springer-Verlag, 1989. (Year: 1989).*
Koziol et al., "Comparison of Spectral and Spatial Denoising Techniques in the Context of High Definition FT-IR Imaging Hyperspectral Data," Scientific Reports, Jun. 2018, 11 pages. (Year: 2018).*
Alsberg et al., "Wavelet Denoising of Infrared Spectra," The Analyst, Jul. 1997, pp. 645-652. (Year: 1997).*
Bhargava et al., "Towards Faster FT-IR Imaging by Reducing Noise," Applied Spectroscopy, vol. 53, No. 11, 1999, pp. 1313-1322. (Year: 1999).*
Jouan-Rimbaud et al., "Application of Wavelet Transform to Extract the Relevant Component from Spectral Data for Multivariate Calibration," Analytical Chemistry, vol. 69, No. 21, Nov. 1997, pp. 4317-4323. (Year: 1997).*

* cited by examiner

*Primary Examiner* — Mark R Gaworecki
(74) *Attorney, Agent, or Firm* — Patterson Thuente Pedersen, P.A.

(57) ABSTRACT

Properties of a sample that are dependent upon wavelength, such as IR absorption, can be detected and deconstructed into wavelets or other basis functions. These basis functions can be compared to determine which have a relatively high likelihood of being noise or signal, and an attenuation factor can be applied to each wavelet. A spectrum can be reconstructed from these wavelets that exhibits a significantly higher signal-to-noise ratio than raw data co-adding would produce in significantly less measurement time.

21 Claims, 14 Drawing Sheets

1 spectrum, SNR=45

20 coaveraged spectra, SNR=170

20 intelligently co-averaged spectra, SNR=3770

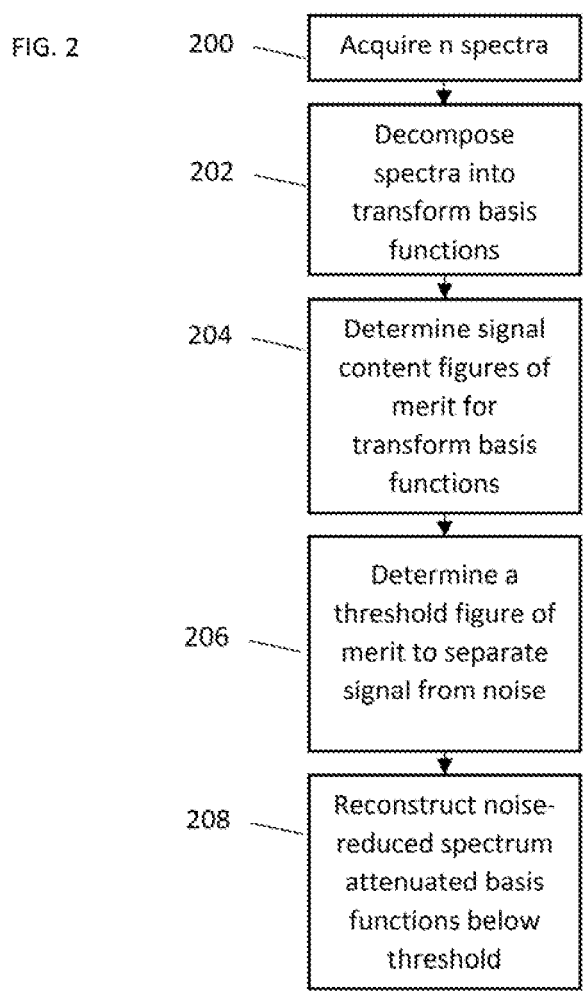

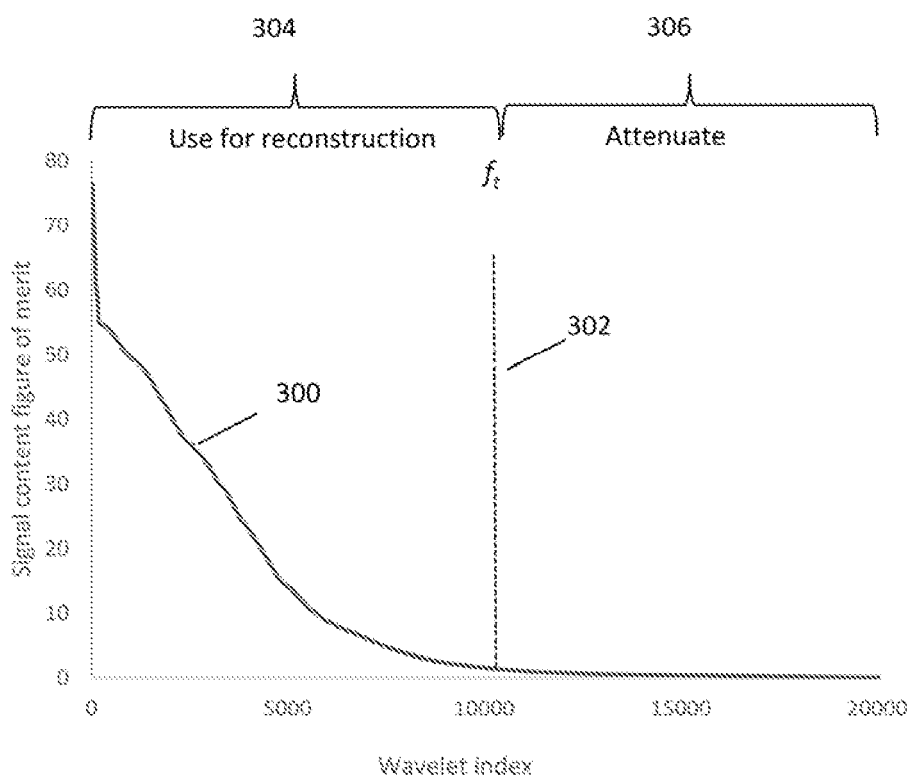

1 raw spectrum, SNR~5

40 co-averaged spectra, SNR~20

40 intelligently co-averaged spectrum, SNR~670

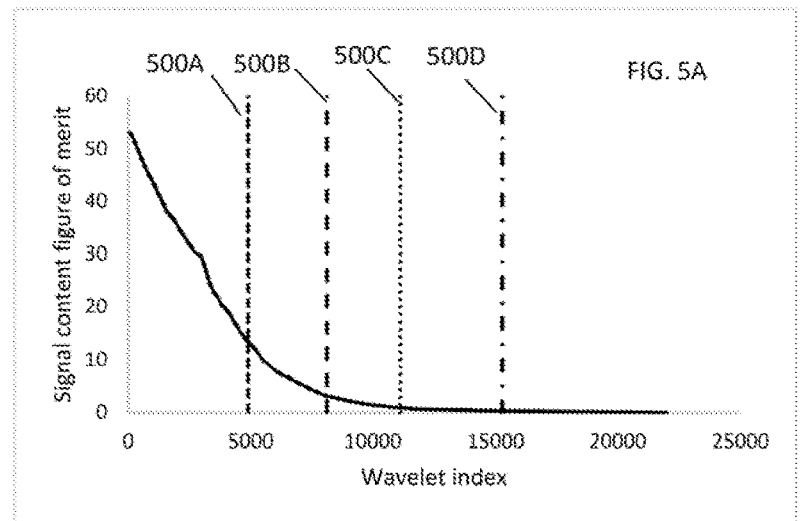
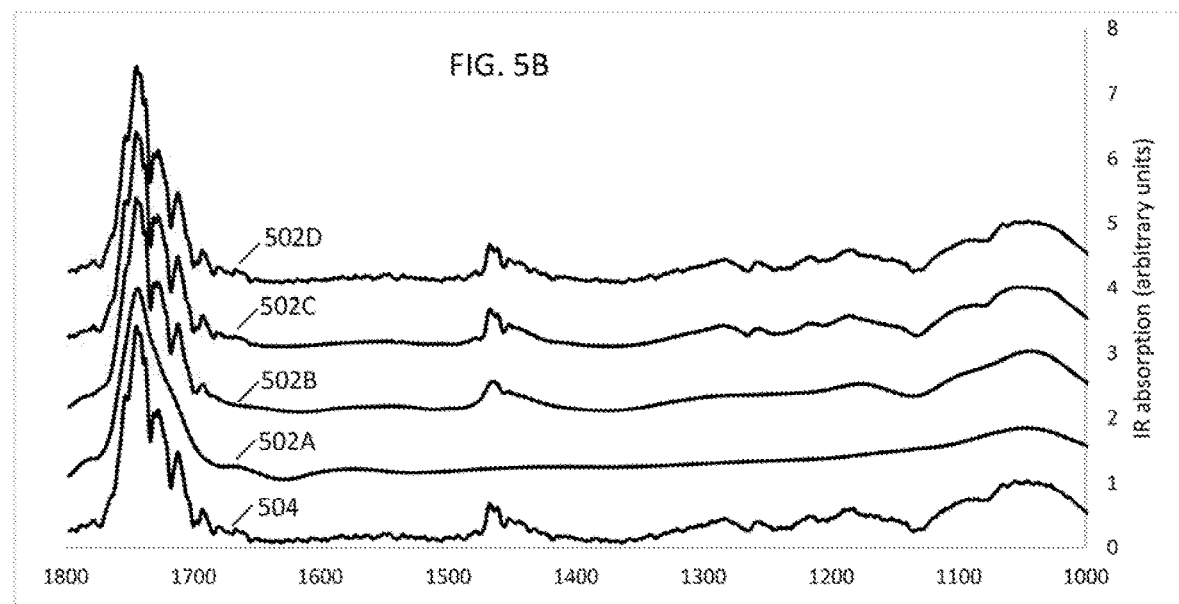

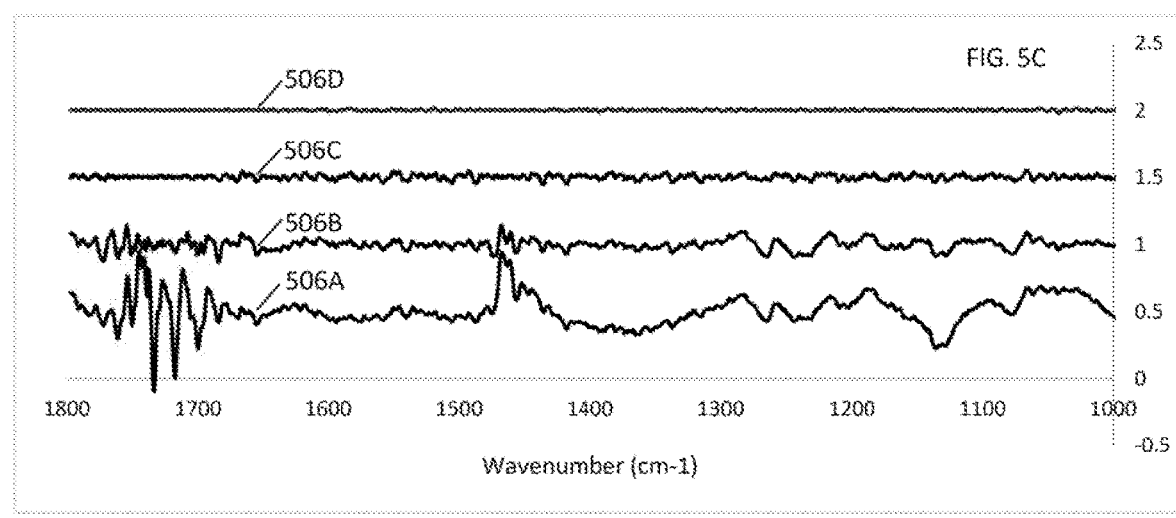

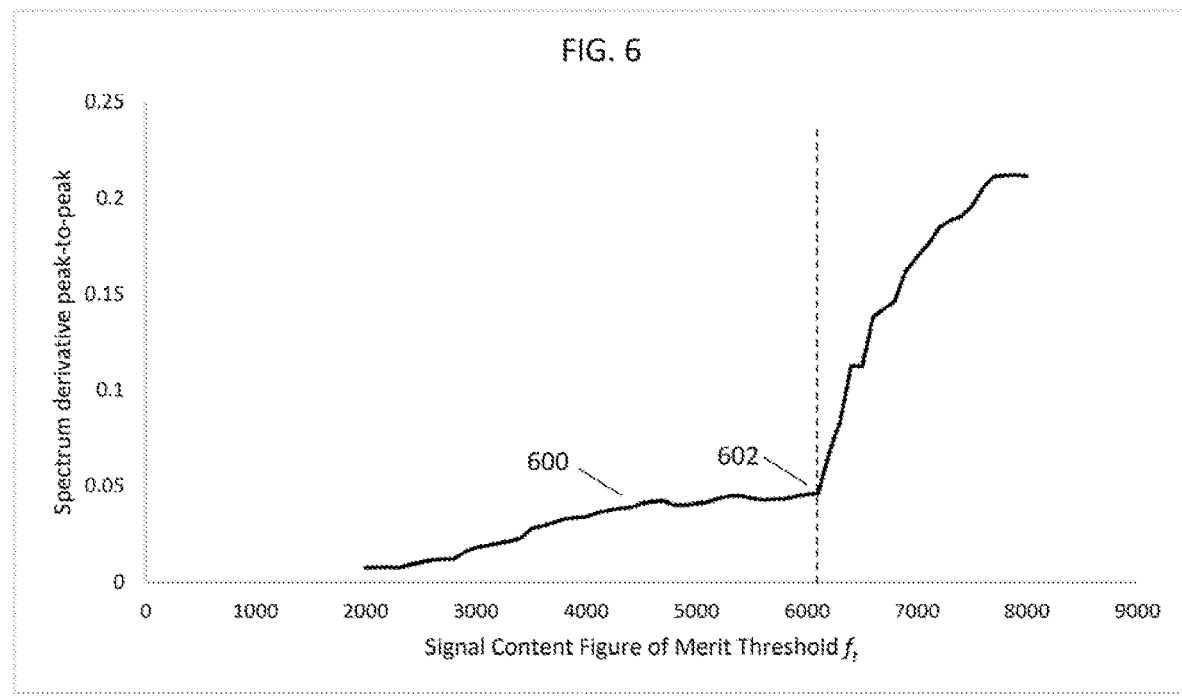
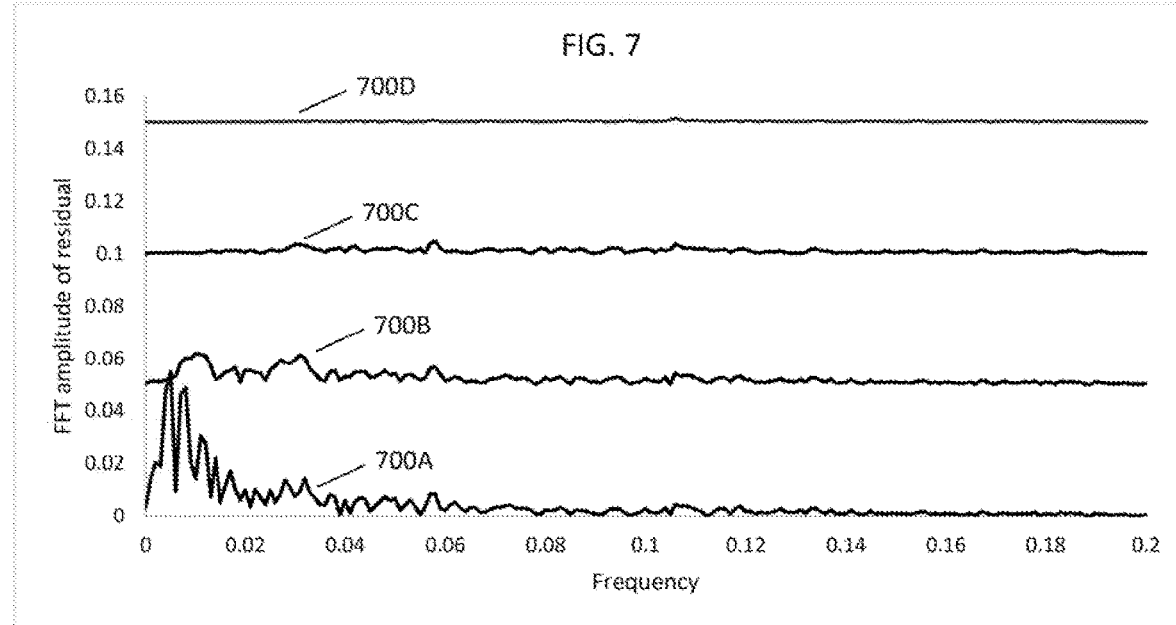

FIG. 10A
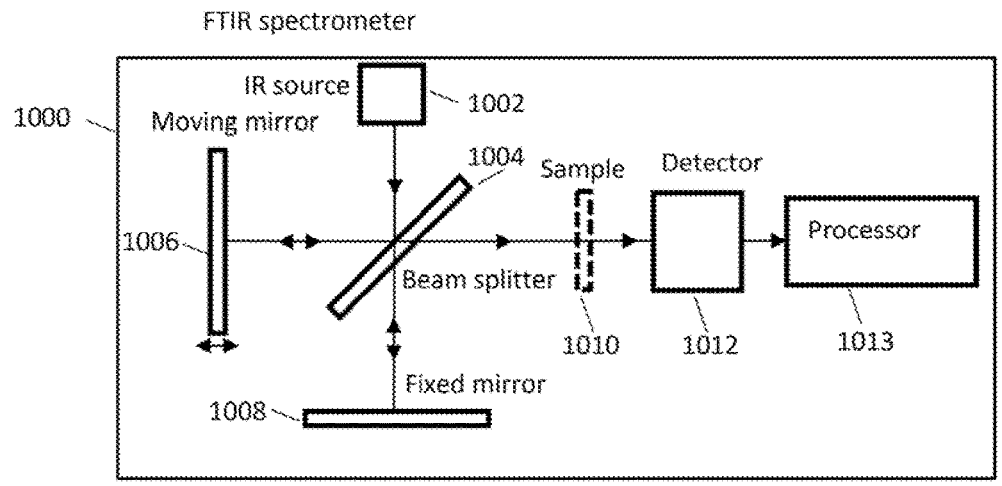
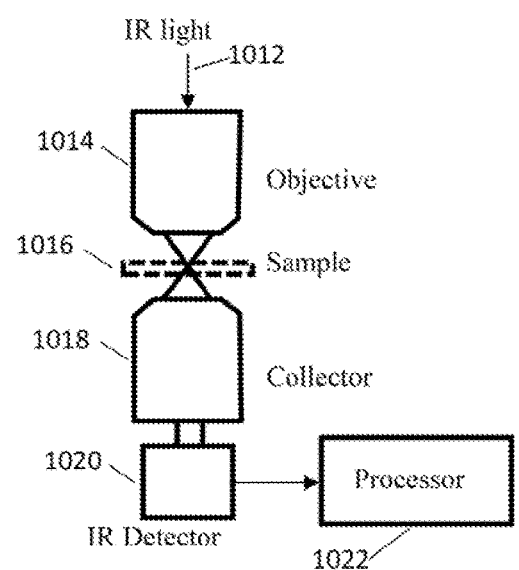
FIG. 10B
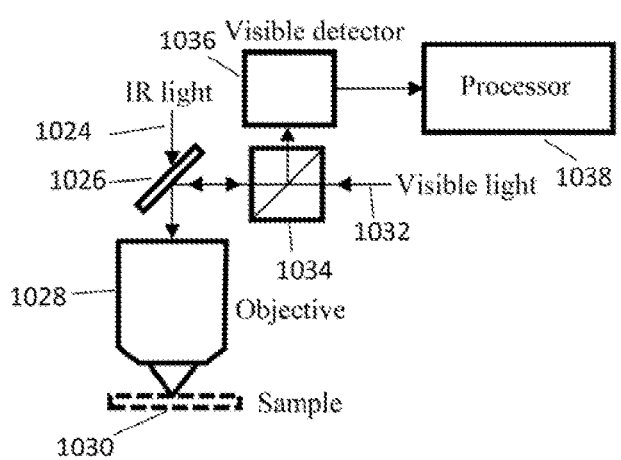
FIG. 10C

METHOD AND APPARATUS FOR REDUCING NOISE IN SPECTROSCOPIC DATA AT A POINT ON A SAMPLE

TECHNICAL FIELD

Embodiments described herein relate to physical sample characterization via spectral analysis, particularly for spectroscopic measurements such as those produced by infrared spectrometry.

BACKGROUND

Spectroscopic measurements, for example infrared absorption spectra, are often performed by co-adding a number of repeated measurements to reduce the impacts of noise in the measurements. Many commercial infrared spectrometers allow the user to program a set number of measurements of a spectrum to automatically acquire and co-add (or equivalently co-average). For measurements with random noise, co-adding improves the signal to noise ratio (SNR) by the square root of the number of co-adds (i.e., measurements included in the co-adding). In practice, this leads to diminishing returns from co-adding or co-averaging. For example, a 10× improvement in SNR would require a $10^2$ (100×) increase in the number of measurements that are co-added, while a 100× improvement in SNR would require a $10^4$ (1000×) increase in the number of measurements.

To improve the SNR by 100× for a measurement that requires 1 second per spectrum, the desired improvement accomplished by co-adding of the raw data alone would therefore require 10,000 seconds of measurement time (or nearly 3 hours) to accumulate a sufficient number of co-adds. For this reason, the number of co-adds used is often set by measurement time constraints, which can result in less than desired SNR.

Various noise reduction techniques are commonly applied to hyperspectral data sets, i.e. spectra measured at a plurality of locations. These techniques generally use assumptions about self-similarity of adjacent or related regions of a sample to reinforce common features between spectra while suppressing differences between spectra of similar regions, assuming that such differences are due to noise. Although this assumption may be useful in certain situations like image processing, it is an imperfect assumption for spectroscopic measurements because on the microscopic level these kinds of samples can be highly heterogeneous. Regions that are spectroscopically similar may in fact not be identical. The assumption of self-similarity can mask out minor differences between different regions of a sample, especially if the variations are spatially rare. Thus one cost to this kind of common feature/region reinforced co-averaging is that spatially small regions that exhibit different optical properties may be lost in processing of data that has insufficient SNR.

Accordingly, there is a need for an improvement in SNR of infrared spectroscopic data that results in minimal or no loss of information, and that does not acquire increased SNR at the cost of excessive measurement time requirements.

SUMMARY

In various embodiments, a solution to one or both of these problems is provided by the use of intelligent co-adding techniques for analysis of spectroscopic measurements, rather than conventional co-adding of raw data or common feature/region reinforced data. In various embodiments, the intelligent co-adding noise reduction techniques overcome the limitations of conventional co-adding for spectroscopic measurements of spectra at the same location, rather than generating the entire hyperspectral analysis at the outset. In embodiments in which the spectroscopic measurements are repeated at the same location, the physical properties being measured are not just self-similar, but rather truly identical and invariant so long as the sample is not being altered by the measurement process or changing environmental conditions or over the duration of the data collection. In various embodiments, intelligent co-adding makes use of information about the invariance of the spectroscopic properties of a single sample location to dramatically improve the SNR and reduce the measurement time over conventional co-adding.

The disclosure herein refers to various embodiments of this process and techniques of the present disclosure as "intelligent co-adding" that can replace conventional co-adding with a significantly more efficient method of reducing noise in the accumulated spectroscopic measurements.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 2 is a flowchart depicting a method for improving signal-to-noise ratio according to an embodiment.

FIG. 3 is a chart depicting the selection of data for reconstruction and removal (or deemphasizing) of data that has insufficient signal content figure of merit, according to an embodiment.

FIGS. 5A-5C depict criteria that can be used to determine whether a threshold for signal attenuation according to various embodiments.

FIG. 6 illustrates an example technique in which a metric of spectral quality was chosen to be the peak-to-peak amplitude of the derivative of the reconstructed spectrum.

FIG. 7 depicts fast Fourier transforms that demonstrate the existence of additional signal data when various basis function sorting functions have been applied, according to four embodiments.

FIGS. 10A-10C depict data collection systems according to an embodiment.

Figure 1A:
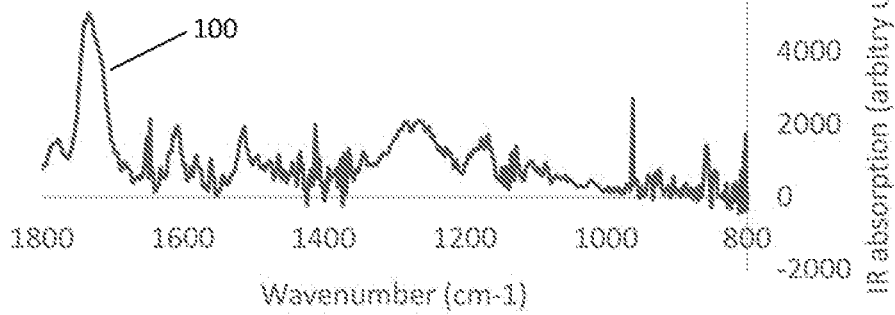
FIG. 1A depicts an infrared spectrum.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

As described herein, improvements in signal-to-noise ratio of spectroscopic measurements can be accomplished by intelligently co-adding spectral data. Intelligent co-adding refers to improving the Signal to Noise Ratio (SNR) with repeated spectroscopic measurements (i.e., co-adding or co-averaging), while maintaining components of the data that are more likely to correspond to actual properties of the sample and discarding components of the data that are more likely to correspond to noise. Measurements are performed at the same location on a sample and that the underlying physical properties of the sample being measured are substantially invariant during the time of a plurality of measurements. This information can be used to substantially separate the signal from the noise and then reconstruct a signal where the noise has been substantially suppressed. The resulting intelligently co-added spectra can thus achieve an order of magnitude or better SNR improvement over conventional co-adding in the same amount of time, and/or dramatically reduce the amount of measurement time required to achieve a given SNR.

Raw spectra can be deconstructed into coefficients of appropriate transform basis functions (wavelets, for example) which are then compared on the basis of their relative signal content, removing or attenuating wavelets with low signal content. In this way noise is selectively removed, and the resulting denoised signal, provides a much more precise measurement of the infrared absorption characteristics of a sample and in a substantially shorter time than conventional co-adding.

In various embodiments, data sets can be decomposed into a sum of transform basis functions and corresponding coefficients. A well-known transform is the Fourier transform. Fourier transforms involve decomposing a function or curve as a sum of sine and cosine waves with varying frequencies, and assigning a weighting coefficient (e.g. amplitude) to each such wave, such that the sum of all of the sine and cosine functions approximates the original curve. (Fourier transforms can be equivalently constructed with sums of complex exponentials with corresponding amplitudes and phases.) For the purposes described herein, a variety of transform basis functions, including Fourier transforms, may be applied. But given the nature of IR absorption spectra, some transform basis functions will perform better than others. While Fourier transforms generally perform best at reconstructing periodic funcrions, IR spectra are generally composed of a series of peaks, so transform basis functions that are comprised of peaked shaped features rather than oscillatory features will generally provide better decomposition of the spectra. One example of a suitable transform is wavelet deconstruction, which was first described by Holschneider et al (M. Holschneider, R. Kronland-Martinet, J. Morlet and P. Tchamitchian). See also Wavelets, Time-Frequency Methods and Phase Space, pp. 289-297. Springer-Verlag, 1989. Wavelet basis functions comprise features that look like small waves that can vary in width and location on the X-axis. Thus they can be suitable for reconstructing the pattern of peaks in a typical IR absorption spectrum.

As used throughout this disclosure, and in order to more clearly describe these concepts, the following terms are used with these accompanying definitions relative to the acquisition, analysis, presentation and utilization of spectroscopic measurements, particularly spectroscopic measurements produced by infrared spectrometry:

Raw spectral data: Optical absorption and/or transmission as a function of wavelength of a particular location of a particular sample (see, e.g., FIG. 1A), or more generally a measurement of an optical property of the region of a sample as a function of wavelength or equivalently wavenumber.

Co-added data: Data that comprises a sum or average of a plurality of raw spectral data. This definition is intended to cover data that is either added or averaged (added and divided by the number of spectra). Both summing and averaging result in identical improvements in SNR, and as such co-adding is also used to refer to co-averaging throughout the application.

Conventional co-added spectrum: Spectral data measured at a common location that is co-added without emphasizing or deemphasizing any data by intelligent co-adding;

Figure of merit: a relative indication of how much a particular transform basis function adds to signal compared to how much that particular transform basis function adds to noise;

Intelligently co-added data: Spectral data that is decomposed into a series of transform basis functions, altering the coefficients of at least a subset of transform basis functions to attenuate and/or zero the coefficients of transform basis functions associated primarily with noise, then reconstructing spectra with the altered basis function coefficients to result in denoised spectral data.

Infrared spectrometer: an instrument that can measure infrared absorption properties of a sample, including, but not limited to a Fourier transform infrared (FTIR) spectrometer, a disperive infrared spectrometer, an optical photoermal infrared spectrometer, a quantum cascade laser based infrared spectrometer or any other instrument that creates spectra indicative of the infrared absorption and/or transmission properties of a sample.

Optical photothermal infared spectrometer: an instrument that illuminates a sample with infrared radiation and then uses a separate optical probe beam via an optical photothermal microscope to measure the photothermal response of the sample where the photothermal response is indicative of IR absorption by the sample. Optical photothermal microscopes can achieve a spatial resolution of less than 1 micrometer by using an optical probe beam with a wavelength much smaller than that of the infrared radiation.

Processor: computing devices, microprocessors, modules and other computer or computing devices, which can be any programmable device that accepts digital data as input, and are configured to process the input according to instructions or algorithms, and provides results as outputs. In embodiments, processors and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations, and can include personal computers, embedded computers, digital signal processors, field programmable gate arrays, programable logic devices, microcontrollers, single board computers, or graphics processing units, for example. The processor also need not be a single device, but may comprise multiple computation devices each executing a portion of the required tasks.

Memory: memory can comprise volatile or non-volatile memory as required by the coupled computing device or processor to not only provide space to execute the instructions or algorithms, but to provide the space to store the instructions themselves. In one embodiment, volatile memory can include random access memory (RAM), dynamic random access memory (DRAM), or static random access memory (SRAM), for example. In one embodiment, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

Attenuated: multiplication of a transform basis function by a coefficient of less than one. In embodiments, attenuation could be multiplication by zero, by a non-zero constant, or by a coefficient that is the output of a function.

Zeroed: attenuated such that amplitiude coefficients associated with specific basis function are set to 0. This is also equivalent to simply omitting the zeroed basis functions from any associated sum;

Noise-reduced: a spectrum that has less noise relative to a conventionally co-added spectrum;

Intelligently co-added data: Spectral data that is combined after being deconstructed into a portion that is determined to be more likely to correspond to noise and a portion that is more likely to correspond to signal.

Figure 1B:
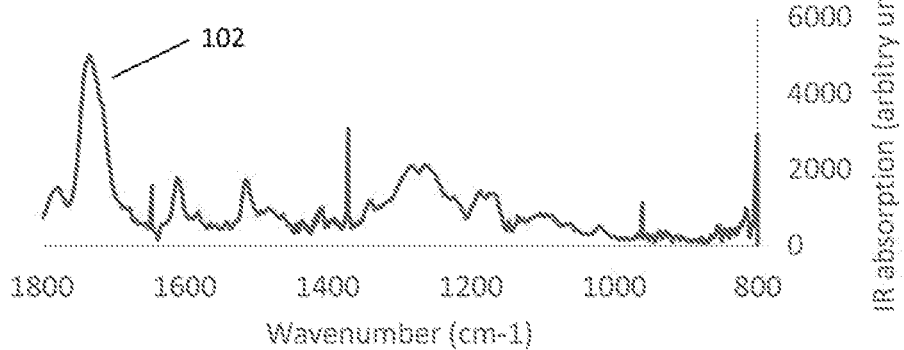
FIGS. 1B and 1C depict averaged infrared spectra to depict an improvement in signal-to-noise ratio according to an embodiment.
Figure 1C:
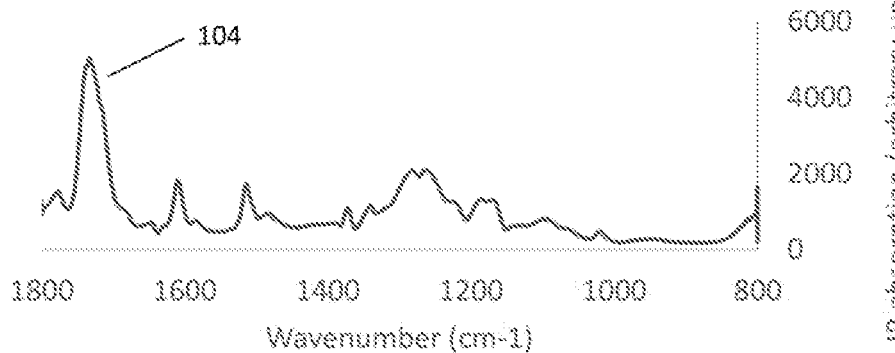

FIGS. 1A-1C illustrate the advantages of intelligent co-adding over conventional co-adding for twenty spectra collected at the same location on a sample. FIG. 1A shows a representative single spectrum 100 of raw spectral data. As described in more detail below with respect to FIGS. 1B and 1C, FIG. 1A is just one of twenty sets of raw spectral data that were collected at the same location of this sample.

FIG. 1B shows a co-added spectrum 102 calculated in the conventional way, i.e. to create a "raw" co-added spectrum. Raw data co-averaging, as described above, is conducted by adding all the spectra together and dividing by the number of spectra collected. (Or in the case of co-adding, the dividing step is omitted.) Statistically speaking, in the case of uncorrelated measurement noise, the fractional uncertainty in a measurement (e.g., the measured absorption at any given wavelength) is related proportional to $1/(2(N-1))^{1/2}$, where N is the number of measurements taken. In other words, the noise/uncertainty in any given measurement decreases proprotional to the inverse of the square root of N. Returning to the specific example shown in FIGS. 1A-1C, this raw data co-averaging system does indeed improve the SNR of the overall spectra by a modest amount, from about 45 to about 170. Thus the raw data co-averaging technique used in conventional systems improves the SNR slowly, in general by the square root of the number of co-adds.

Even this general rule, by which error in the measurements can be determined based upon the square root of N, applies accurately only when comparing SNR values at larger numbers of co-adds. It is not always accurate in predicting the SNR improvement from a single spectrum to a number N that is low enough, such as N=twenty spectra, because of the stochastic nature of the noise in the single spectrum and hence the large variability in SNR of individual spectra.

FIG. 1C shows the result of applying the intelligent co-adding approach described herein to create a substantially noise-reduced spectrum 104, according to one embodiment. By using assumptions about the self-similarity of repeated spectra obtained at the same location to identify and separate signal and noise compoonents, it is possible to substantially suppress the noise to achieve a SNR of 3770 in reconstructed spectrum 104. This is an improvement of 22× over the conventional co-avergaging illustrated in FIG. 1B.

The improvement in SNR between FIGS. 1B and 1C is accomplished as illustrated in the flowchart in FIG. 2. As shown in FIG. 2, at 200 a set of n spectroscopic measurements $S_i(\lambda)$ are acquired at the same location. By collecting these measurements at the same location of the sample, the expected results of each raw spectral data set should be invariant. At 202, the n spectra are decomposed into a series of transform basis functions and associated coefficients. The transform basis functions can be selected from any of a number of possible options. In a preferred embodiment, the raw spectral data are decomposed into series of wavelets, as described in more detail below.

In practice, to obtain spectra 200 a user of a system according to an embodiment will obtain n spectroscopic measurements $S_i(\lambda)$ attempting to measure a physical property of a sample, for example the absorption as a function of wavelength $A(\lambda)$. Measurements performed at the same location should have the exact same physical properties $A(\lambda)$, but each measurement $S_i(\lambda)$ will be contaminated by a variable amount of noise $N_i(\lambda)$ as shown in Eq. 1.

$$S_i(\lambda) = A(\lambda) + N_i(\lambda) \quad \text{Eq. 1}$$

The conventional approach of co-adding spectra simply adds up each $S_i(\lambda)$ and optionally divides by the number of spectra, as shown in Eq. 2.

$$\overline{S_i}(\lambda) = \frac{1}{n} \sum_{i=0}^{n-1} (A(\lambda) + N_i(\lambda)) \quad \text{Eq. 2}$$

Since $A(\lambda)$ is assumed constant through the measurement, the goal of this averaging is to decrease the relative contribution of the random noise $N_i(\lambda)$ via successive trials. As mentioned previously, this method is not very efficient, reducing the fractional impact of the noise term by the square root of n the number of measurements.

The current approach described herein decomposes the measurements $S_i(\lambda)$ into a series of m coefficients of a set of m transform basis functions w(m), as shown in Eq. 3.

$$S_i(\lambda) = \sum_{j=0}^{m-1} a_m w(m) \quad \text{Eq. 3}$$

A large variety of different basis functions w(m) may be successfully employed. Wavelets are especially suitable transform basis functions as they can be selected to have shapes similar to absorption peaks in IR spectroscopy. In one embodiment biorthogonal wavelets are employed.

At 204, the coefficients of the series of transform basis functions are used to determine a signal figure of merit. The signal figure of merit is a metric for ranking the relative signal content in each transform basis function in the series. The goal of the current approach is to substantially improve upon the conventional co-averaging/co-adding technique by using a signal content figure of merit to substantially discriminate between the signal and the noise.

Using the signal content figure of merit at 206, a threshold to substantially separate transform basis functions associated with signal from those primarily associated with noise is determined.

The next step is to examine the distribution of the coefficients $a_m$ for each spectrum $S_i(\lambda)$ to assess the signal content of each basis function w(m). In particular, we construct a suitable signal content figure of merit that can be used to identify a subset of transform basis functions that have high signal content versus those that have low signal content and/or high noise, i.e. those that do not represent signal content with high confidence. One suitable signal content figure of merit (FOM) is given by $|\mu_m|/\sigma_m$ where $|\mu_m|$ is the absolute value of the mean of each $a_m$ and $\sigma_m$ is the corresponding standard deviation. This ratio of $|\mu_m|/\sigma_m$ can then be calculated for the coefficient $a_m$ for each transform basis function w(m). A basis function that contributes strongly to the real signal $A(\lambda)$ will have both a relatively high mean $\mu_m$ and a lower standard deviation $\sigma_m$, and thus a higher signal content figure of merit $|\mu_m|/\sigma_m$. Conversely, basis functions that are portions of the noise $N_i(\lambda)$ will often (but not always) have lower mean values $\mu_m$, but will almost always have large standard deviations $\sigma_m$ due to the fact they are random and hence not constant over successive measurements. Thus the figure of merit $|\mu_m|/\sigma_m$ provides a metric that can be used to efficiently separate out the basis functions $w_s(m)$ whose coefficients contribute primarily to the signal $A(\lambda)$ and those basis functions $w_n(m)$ that contribute primarily to the noise $N_i(\lambda)$.

While wavelets have been referred to above, it should be understood that other types of basis function could be used in alternative embodiments. In fact, in order to determine the best approximation, in some embodiments different types of basis function can be used and compared to determine which function leads to the highest SNR.

At 208, a noise-reduced version of the spectroscopic signal is created, in which the coefficients of transform basis function primarily associated with noise are substantially attenuated while those associated primarily with signal are maintained. This noise-reduced version is an intelligently co-added spectrum, such as the one shown in FIG. 1C. The blocks 202, 204, 206, and 208 represent computation modules, for example 202 the decomposition module, 204 the merit determination module, 206 the threshold module, and 208 the attenuation and reconstruction module. These modules may be implemented as software code executed on one or more processors. All modules may be implemented on one processor or can be distributed over multiple processors. For example some modules may be executed on an embedded controller like a digital signal processor, a field programmable gate array, microcontroller, single board computer, etc., and one or more other modules may be implemented on a host computer, for example a personal computer.

FIG. 3 shows a ranking plot where a signal content figure of merit 300 is plotted for each wavelet, ordered from highest to lowest value. This ranking plot provides a useful means of determining a threshold $f_t$ (indicated by dashed line 302) that can be used to separate transform basis functions with high signal content versus those basis functions that contribute substantially to noise. Using the threshold $f_t$ as a dividing line, we can then discriminate each basis function w(m) into being either part of the real physical property $A(\lambda)$ or alternately part of the random noise $N_i(\lambda)$.

According to some embodiments, the threshold 302 determined automatically. A computer-implemented embodiment may, for example, set the position of threshold 302 at a desired signal content level (i.e., a fixed position on the y axis). In another embodiment, a computer-implemented embodiment may determine a number of data points that are required to generate a comprehensive intelligently co-added spectrum, and write off any additional data points (i.e., retain a desired minimum number of data points to the left of threshold 302 in the embodiment shown in FIG. 3). In still further embodiments, a computer-implemented system may detect, for example, and inflection point in a fit curve to the signal content figure of merit 300 line, and adjust threshold 302 such that data to on one side of the inflection point is used for reconstruction while data on the other side is attenuated.

In still further embodiments, the appropriate position for threshold 302 can be determined by a user directly, rather than relying upon a computer implementation. For example, a user can observe the effect on the reconstructed spectrum of moving the threshold 302 relatively higher or lower. An experienced operator will be able to diagnose the effects of attenuating too much data (choppy lines, missed narrow "peaks" in absorption spectra) or attenuating too little data (fuzzy data lines) to achieve optimum intelligent co-adding.

In other embodiments, a user and a computer-implemented system can work together, such as by permitting user or expert to manipulate the threshold 302 and applying machine learning for the computer to determine the criteria applied by that user or expert. Over time, a machine-learning based system can detect the types of things (inflection points, line fuzziness, commonly-found peaks) that experts look for. Alternately or additionally, machine learning algorithms can learn the correlation between specific threshold settings and desired levels of denoising. After gaining sufficient experience, such machine learning algorithms can "suggest" or automatically apply an appropriate threshold 302.

The threshold selected results in a mathematical difference in how the data is calculated, as illustrated in the differences between FIGS. 1B and 1C. This difference is set forth below in Eq. 4, in which the raw spectrum signal $S_i(\lambda)$ is written as the sum of two sums, one over the subset of basis function $w_s(m)$ that contribute primarily to signal, i.e. with high signal content figures of merit $f \geq f_t$, and another sum over a subset of basis functions $w_n(m)$ that contribute primarily to noise (i.e., with low figures of merit $f < f_t$).

$$S_i(\lambda) = \sum_{f \geq f_t} a_{ms} w_s(m) + \sum_{f < f_t} a_{mn} w_n(m) \quad \text{Eq. 4}$$

Once the separation is performed on the basis of the figure of merit corresponding to the threshold selected either by the user or by a computer, it is possible to attenuate the coefficients $a_{mn}$ of the transform basis functions $w_n(m)$ that contribute primarily to noise by multiplying these coefficients with an attenuation factor $\gamma_m$, as shown in Eq. 5. For example it is possible to calculate a new noise-reduced measurement $S_i'(\lambda)$ summing over a subset of basis functions that substantially contribute to the signal, while attenuating those that primarily contribute to the noise.

$$S_i'(\lambda) = \sum_{f \geq f_t} a_{ms} w_s(m) + \sum_{f < f_t} \gamma_m a_{mn} w_n(m) \quad \text{Eq. 5}$$

The two subsets represented by this sum are shown in FIG. 3 as subset 304 ("Use for reconstruction") and subset 306 ("Attenuate"). In the simplest case, the attenuation factor $\gamma_m$, can be set to zero for all low signal content basis functions, resulting in the following:

$$S'_i(\lambda) = \sum_{f \geq f_t} a_{ms} w_s(m) \qquad \text{Eq. 6}$$

In Eq. 5, setting $\gamma_m$ to zero is also equivalent to simply omitting the second term in the equation, i.e. omitting all the transform basis functions from the sum where the figure of merit is less than the threshold. In the context of this specification, the word "attenuate" when used to refer to attenuating or zeroing a subset of transform basis function coefficients also covers the case of simply omitting them from the reconstruction sum, omitting the second term in Eq. 5 to result in Eq. 6.

However, the application of an attenuation factor of zero removes the unreliable data measurements in their entirety, and in some cases there may be valuable data within the raw spectra. Alternately, therefore, it is possible to apply a series of variable attenuation factor $\gamma_m$ that smoothly vary from high values for basis functions with high figures of merit to low values for basis functions with low figure of merit. That is, "more reliable" data having a higher likelihood of including valuable signal data can be given a higher attenuation factor on a sliding scale.

As described above, the sliding scale can be determined by a user manually selecting attenuation factors manually (which would take quite some time as there can be tens or hundreds of thousands of wavelets in a typical scan) or by selecting attenuation factors as a function of figure of merit. In embodiments, the results of setting attenuation factor for wavelets or sets of wavelets can be depicted for a user in real-time. Machine learning could be applied in some embodiments such that a user of the system could have attenuation factors suggested that result in relatively higher SNR.

Figure 4A:
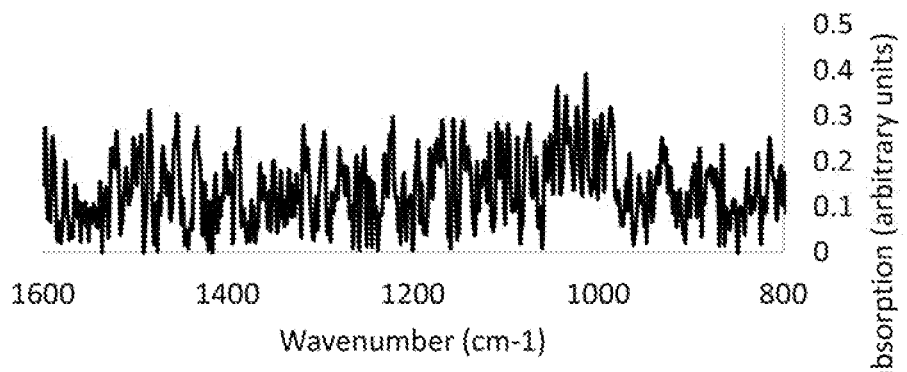
FIGS. 4A-4C depict an improvement in signal-to-noise ratio using intelligent co-adding according to an embodiment.
Figure 4B:
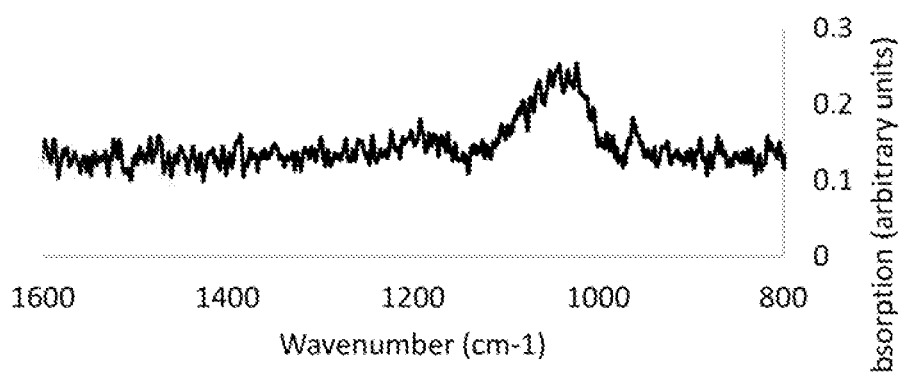
Figure 4C:
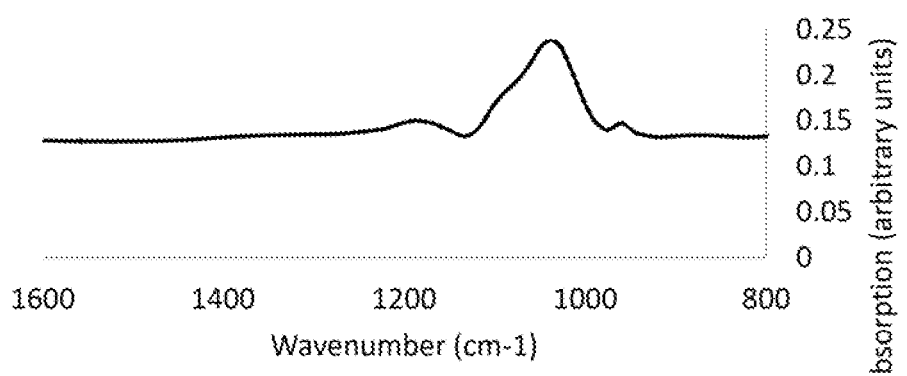

FIG. 4 shows another example of creating a noise-reduced spectrum using the process described above. This example demonstrates the ability to reconstruct spectra with acceptable SNR via intelligent co-adding even when the single spectrum SNR is very poor. FIG. 4A shows a sample single spectrum on a microscopic particle that was acquired in 1 second. The single spectrum SNR was ~5 for the measurement conditions used. FIG. 4B shows a co-addition of 40 spectra using the conventional co-adding approach. The 40 spectra were acquired in 40 seconds total acquisition time, achieving an SNR of ~20. FIG. 4C shows the result of intelligent co-added spectra calculated as described above using the same 40 spectra. The noise-reduced spectrum of FIG. 4C achieves an SNR of 670, roughly a 33.5× improvement over conventional co-adding. It is important to recognize the time savings achieved via the intelligent co-adding approach. To achieve a 33.5× improvement in SNR via conventional co-adding would require the measurement and co-adding of $(33.5)^2 = 1122\times$ more spectra. So the acquisition time to achieve an SNR of 670 using conventional co-adding would require 1122×40 sec=44890 sec, or 12.5 hours. In practice such long averaging time can actually fail to improve the SNR due to slow drifts in the instrument over time, including drifts in sensitivity and measurement position or degradation or other change in the sample itself, such as those caused by temperature cycling. But using intelligent co-adding, we obtain an SNR of 670 in 40 seconds, even starting with a very poor SNR~5. Saying it another way, intelligent co-adding achieved 33.5× improvement in SNR in the same measurement time, or 1122× improvement in measurement time for the same SNR. In either case, the intelligent co-adding technique can achieve orders of magnitude improvement in the productivity of spectroscopic measurements in situations where measurement noise is prevalent.

The selection of an appropriate signal content figure of merit threshold can be either under user control or can be completely automated depending on the user sophistication and the end application. FIG. 5A shows another signal content figure of merit ranking plot similar to FIG. 3. In this case FIG. 5A shows four different possible threshold values, labeled 500A, 500B, 500C, and 500D. FIG. 5B shows a plot of corresponding noise reduced reconstructed spectra 502A-D using the thresholds 500A-D in FIG. 5A to separate tentative signal and noise regimes. By comparison spectrum 504 is a conventionally coadded spectrum. FIG. 5C shows a plot so called "residuals" 506A-D, which are calculated by subtracting noise reduced spectra (502A-D) of FIG. 5B with different threshold values from a co-added spectrum 504 calculated by conventional co-adding. When the threshold is set too low, e.g. at the threshold 500A in FIG. 5A, the corresponding resulting residual 506A in FIG. 5B has lots of structure. This indicates that the spectrum has been oversmoothed and true spectroscopic information has been omitted from the reconstructed spectrum.

As the signal content figure of merit threshold is moved to the right to include more wavelets in the reconstruction, the spectra become more faithfully reproduced and the residuals become more featureless. In the best case the residual contains substantially only noise and no spectral features, as represented in residual 506C and corresponding recontructed spectrum 502C. If the threshold is pushed too far to the right, all real spectral features are reproduced but at the cost of an inclusion of some of the measurement noise, as shown in spectrum 502D. These tradeoffs can be observed in real-time by providing the user a real-time display of plots similar to those in FIGS. 5A-5C. The user can then slide the threshold cursor (e.g. 302 in FIG. 3) back and forth while watching the reconstructed spectrum and resulting residual. Even with up to 100 raw spectra, reconstructed spectra can be readily calculated in less than 0.1 sec, thus providing real-time feedback to a user to adjust the threshold and immediately see the resulting intelligently co-added spectrum. The user may then balance the accurate reconstruction of spectral features versus the suppression of noise. In many cases it will only be necessary for the user to set this threshold once for a given sample and measurement conditions. Afterwords, the threshold selected by the user can be applied to all subsequent measurements on the same or similar samples and under the same or similar measurement conditions.

Automated algorithms may also be used to set the threshold, as described above. We described above one signal content figure of merit $f = \mu_m / \sigma_m$ where $\mu_m$ is the average coefficient of a basis function and $\sigma_m$ is the standard deviation of that coefficient. In this case, the vertical axis of the figure of merit ranking plot represents in effect the signal to noise of a specific basis function. So when this number is well below unity, the associated basis functions have little or no signal content. In practice, it is often possible to set a threshold $f_t$ to a point where the ranking intersects a fixed value on the vertical scale. Empirically we have found that threshold values of 0.1-1 usually result in well reconstructed spectra with a efficient noise suppression.

Adaptive techniques can also be applied where the threshold is adjusted while calculating a metric of the quality of the spectrum. FIG. 6 illustrates an example of such a technique where a metric of spectral quality was chosen to be the peak-to-peak amplitude of the derivative of the reconstructed spectrum. Such features can be measured not just on the reconstructed spectrum data, but also on the residual data itself. The ideal residual is a flat line with just noise. The presence of features in the residual, unless they are "broad" (i.e., extending across a large number of wavelets or other basis functions) should give rise to a derivative signal that can be detected to indicate the presence of signal rather than noise.

No matter which of these features is used to set the threshold 602, the resulting data collection schema can be sensitized for generating high-SNR spectra of solid state materials for two reasons. First, solid state materials generally have broad spectral lines in IR absorption spectra. Second, random noise usually has higher frequency content that has a much higher derivative than true spectral features. As such, the peak to peak amplitude of the derivative can provide a sensitive metric to the onset of noise content in the basis function ranking plot. FIG. 6 shows the a signal 600 indicative of peak to peak amplitude of the derivative of a spectrum while the figure of merit threshold is adjusted over a range of wavelet indices. A clear transition point 602 is apparent (marked with a dashed line) that clearly discriminates between basis functions that contribute primarily to signal (left of the dashed line) versus those that contribute primarily to noise (to the right of the dashed line). This transition point 602 corresponds very well to the optimal threshold found empirically by manual adjustment of the threshold.

Many other suitable metrics and optimization approaches can be used as well. For example, it is possible to adjust the threshold until the RMS amplitude of the residual achieves a target value. Another approach is to observe the frequency content in the residual, for example using a Fast Fourier Transform (FFT). The method described herein, separating spectral data into wavelets and associating a figure of merit that can be compared to a variety of phenomena, can be applied generally, and different phenomena can be selected depending upon various factors including the type of sample to be tested, in embodiments.

FIG. 7 shows Fast Fourier Transforms (FFTs) 700A-D of the residuals 506A-D shown and described previously with respect to FIG. 5C. FFTs are good indicators of the remaining spectral content left in the residual. For example FFT 700A shows large peaks in the low frequency range (e.g. between 0-0.06 on the frequency axis), corresponding to the spectral information left out of the the reconstructed spectrum 502A in FIG. 5B and thus remaining in residual 506A in FIG. 5C. The FFT 700C, however has very little low frequency content left, indicating accurate reconstruction of the spectrum, and noise that is relatively evenly distributed over all frequencies. FFT 700D shows the effect of adjusting the threshold too high such that all the signal and most of the noise has been used to reconstruct the spectrum and thus the noise reduction is not efficient. A plot similar to FIG. 3 or FIG. 6 can be created to show the amount low frequency content in the residual as a function of threshold value to aid in either manually or automatically selecting the automated threshold. Many other similar metrics, for example power spectral density plots may be used for evaluating the frequency content of the reconstructed spectra.

These remaining non-noise indicators can be indicators of types of suitable transformations that may be applied to the spectrum as part of the noise rejection step. As described previously and illustrated in equation 3, each spectrum is decomposed into a sum of appropriate transform basis functions with associated coefficients. One example of a commonly used transform is the FFT where a signal is decomposed into a sum of sines and cosines of difference frequencies and associated coefficients. In this case, the transform would be the FFT and the sines and cosines would be the transform basis functions. The FFT is often a desirable transform as the amplitudes and frequencies of the sines and cosines can be calculated extremely efficiently via a simple closed form computation. While the FFT can be excellent for periodic signals, it is less desired for transforming signals that non-oscillatory/non-periodic. For signals like IR absorption spectra, it may be desirable to use a basis function that has the shape of a peak or an impulse. For example, IR spectra are generally composed of a sum of molecular oscillations at specific frequencies, so transform functions that comprise a peak like shape can better reproduce the spectral content of IR spectra. It is possible in principle to decompose a spectrum into a series of peaked functions, for example Gaussian and/or Lorentzian functions, though this can be computationally intensive as it could involve extensive curve-fitting. But alternatives are available that are very computationally efficient, for example wavelet transformations. A specific wavelet transformation that can provide good results is the undecimated wavelet transform, also known as the stationary wavelet transform or other names. It should be recognized that a variety of different types of wavelets or other transform basis functions could be used, and some may be more suited to use with particular types of spectra.

Figure 8:
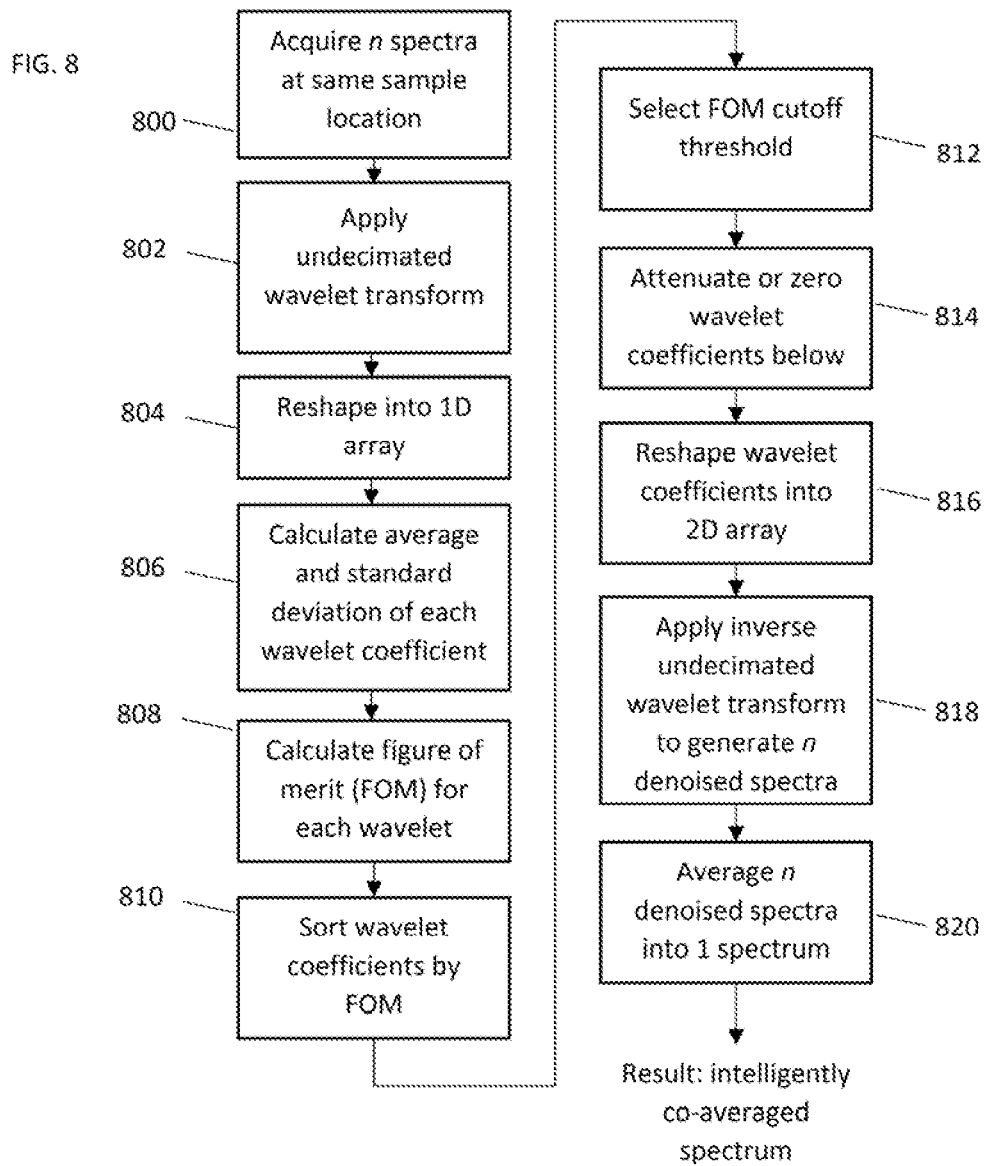
FIG. 8 is a flowchart of a specific intelligent co-adding method, according to an embodiment.

FIG. 8 illustrates a specific embodiment of intelligent co-adding. At 800, an infrared microscope, for example a photothermal infrared microscope, is used to acquire n infrared spectra at the same location on a sample. The sample is assumed to be substantially invariant during the acquisition of these n spectra, so it can be assumed that the intrinsic IR absorption properties of the sample location are constant. Accordingly, any fluctuations between spectra at the same location are assumed to be due to noise. Notably, acquisition of sample information should be done non-destructively and as close as possible to the original location such that these assumptions remain accurate.

In various embodiments, the techniques may substantially eliminate the non-common noise, while retaining the true signal of the IR absorption (i.e., resulting in a denoised IR spectrum of the sample location). Therefore at 802, the n spectra from the sample location are transformed using an undecimated wavelet transform. As described above, other wavelet transforms and more generally other transforms may also be successfully used in other embodiments. A variety of different wavelet basis functions can be employed successfully, although wavelets with smoother and more symmetric "mother wavelets" tend to produce better results in accurately reproducing IR spectra. Biorthogonal wavelets, including the FBI 4,4 wavelet, as well as Coifflet and symmlet wavelets for example can all produce acceptable results. Other wavelets can also be used successfully.

In the case of using an undecimated wavelet array, applying an undecimated wavelet transform at 802 results in a 2D array comprised of n sets of wavelet transform coefficients at different levels of detail. At 804 the 2D array is optionally reshaped into a 1D array of wavelet coefficients that can be sorted easily in a later step. In step 806, the average p and standard deviation a are calculated for each wavelet coefficient across each of the n spectra. This step is used to assess the variability of the wavelet coefficients, for use in determining which wavelets to use to reconstruct denoised spectra in following steps, which can be conducted either sequentially or in other order as appropriate. Not all steps must be performed in alternative embodiments.

At 808, a figure of merit (FOM) is calculated for each wavelet coefficient. As described above, a suitable figure of merit can be $|\mu|/\sigma$, but other related figures of merit can be applied in various embodiments. At 810, the wavelet coefficients are sorted by the figure of merit, i.e. to rank the wavelets in order of high versus low signal content (or equivalently low versus high noise content). At 812, a FOM cutoff threshold is selected to determine which wavelet coefficients to maintain and which to attenuate or discard. This can be performed by a human operator and/or by an automated algorithm. At 814, low signal/high noise wavelet coefficients that are beyond the FOM cutoff are attenuated or set to zero to create a denoised set of wavelet coefficients. At 816, if 804 has been previously applied, the wavelet coefficients are reshaped into a 2D array with dimensionality matching that of the undecimated wavelet transform of 802. (If a wavelet transform has been applied that only produces a 1D output at 802, then 804 and 816 can be omitted.) At 818, an inverse undecimated wavelet transform is applied to the n sets of denoised wavelet coefficients, resulting in n denoised spectra. At 820, the n denoised spectra are added or averaged together to result in a single intelligently co-added spectrum for the location on the sample. This process can optionally be repeated at a plurality of points on the sample.

The process described above, can be modified to use different wavelets, different wavelet transforms, e.g. the discrete wavelet transform, or even altogether different transformations with different basis functions, and different specific implementation algorithms can be applied. In any case, the common approach will be (1) transformation of a plurality of spectra at a single location into a set of transform coefficients; (2) evaluating the variability of the transform coefficients; (3) ranking the transform coefficients by a figure of merit based on the variability; (4) attenuating or zeroing out a subset of transform coefficients whose figure of merit indicates high variability; (5) performing an inverse transform to reconstruct de-noised spectra.

Figure 9A:
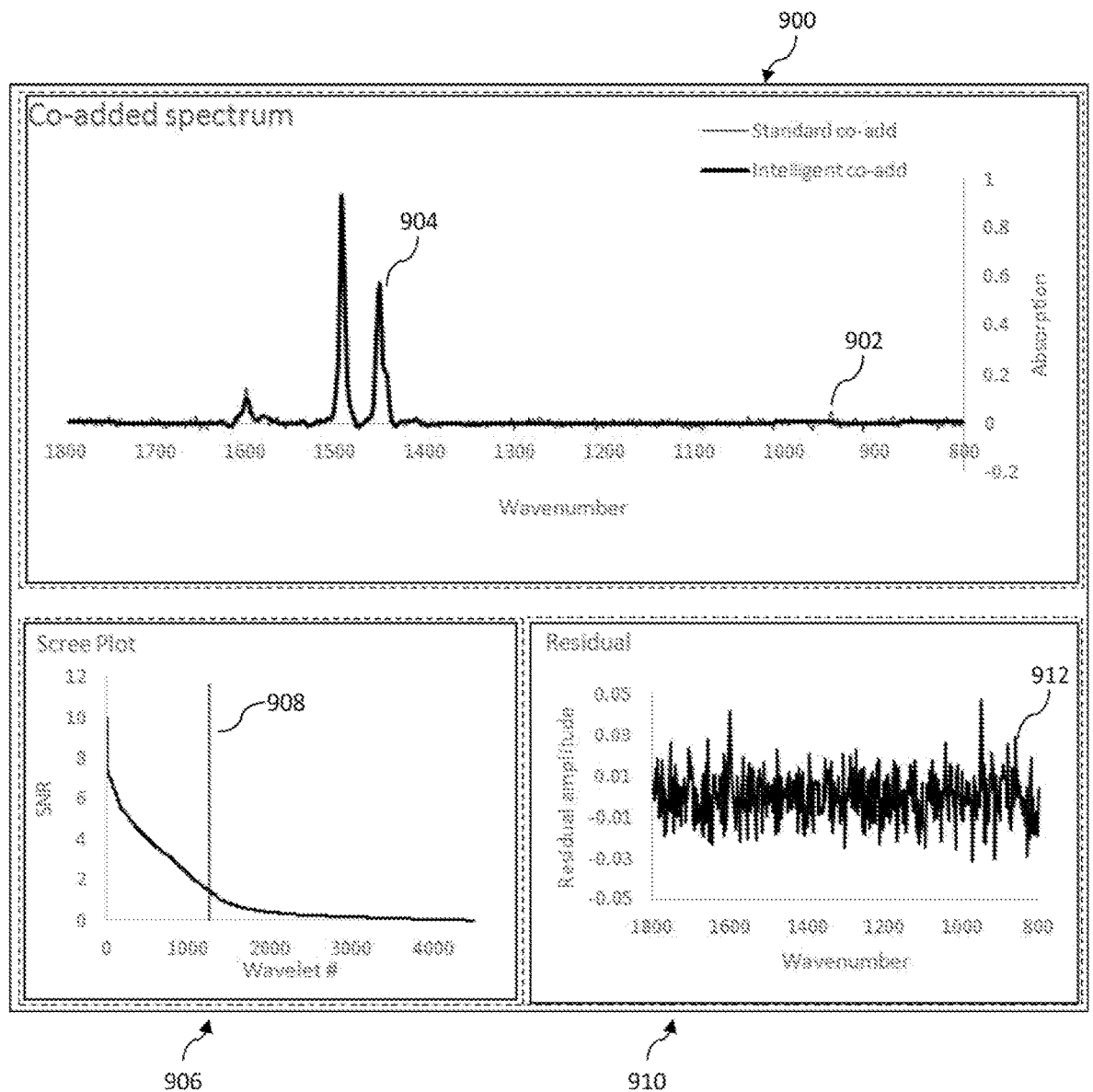
FIGS. 9A-9E are graphical user interfaces, according to embodiments.
Figure 9B:
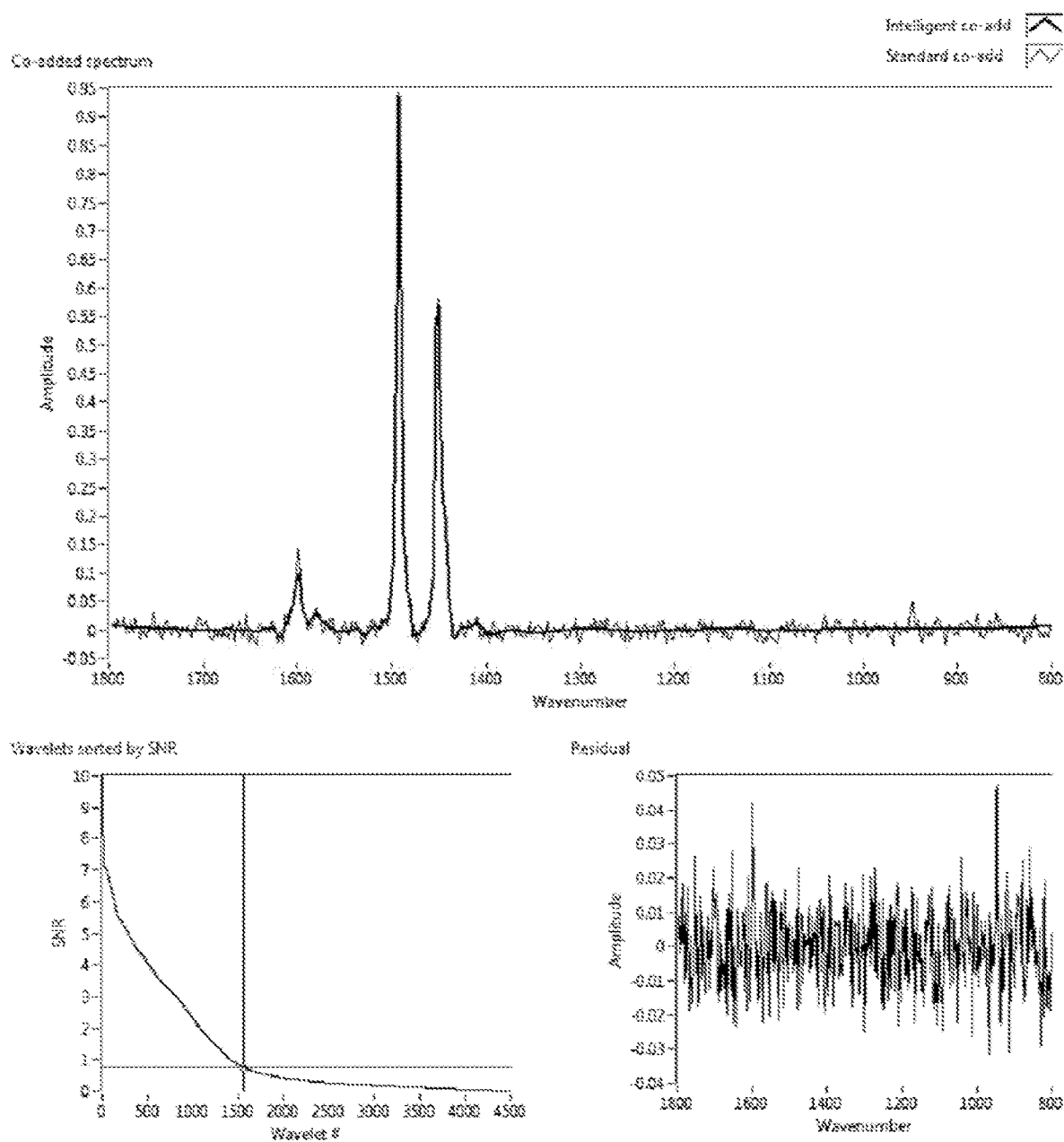

FIG. 9A shows an example of a user interface for a human operator to select a figure of merit threshold for reconstruction of an intelligently co-added/denoised spectrum. FIG. 9A is a simplified example of a user display for example on a computer screen according to an embodiment. The original view is shown in FIG. 9B. In FIG. 9A, panel 900 shows an example of a display used to visualize and optimize the intelligently co-added spectrum. It optionally shows an overlay of the standard co-added spectrum (thin line, 902) and an intelligent co-added spectrum (thick line, 904). The optional display of the standard (conventional) co-added spectrum can provide a useful visual reference to see (1) how faithfully the intelligent co-add process is reproducing features in the spectrum and (2) to visualize the degree of denoising accomplished. Panel 906 shows a "scree plot" that plots the signal content figure of merit (in this case signal to noise ratio SNR) against the index of the transform basis function (in this case wavelet #). A signal content threshold indicator is illustrated with movable cursor 908. In embodiments, the cursor 908 can be moved by a human operator while observing changes in the intelligent co-added spectrum 904 in panel 900. Another useful tool for optimization is shown in panel 910, the residual plot. Residual plot 910 plots the difference between the standard (conventional) co-added spectrum and the intelligently co-added spectrum. A human user can adjust cursor 908 in panel 906 while watching the reconstructed spectrum 904 in panel 900 and the residual curve 912 in panel 910. The user can then attempt to achieve a reconstructed spectrum 904 that wherein the noise is substantially reduced and the residual curve 912 shows substantially only noise.

As mentioned previously, this optimization process can also be completed automatically without user adjustment, in embodiments. For example, the signal content threshold indicated by cursor 908 in the embodiment shown in FIG. 9A can be adjusted automatically by a computer or other processor to optimize a figure of merit of the quality of the reconstructed spectrum, a minimization of spectral features in the residual plot. Optimal setting of the threshold can also be performed by machine learning (i.e. having a human user train a machine learning algorithm appropriate threshold settings for a plurality of spectra and then having the machine learning algorithm select the threshold for future spectra. Alternately a human user can experimentally determine optimal threshold settings on a test set of data and then this threshold can be programmed into a measurement/analysis recipe to be performed later automatically and without user intervention.

Figure 9C:
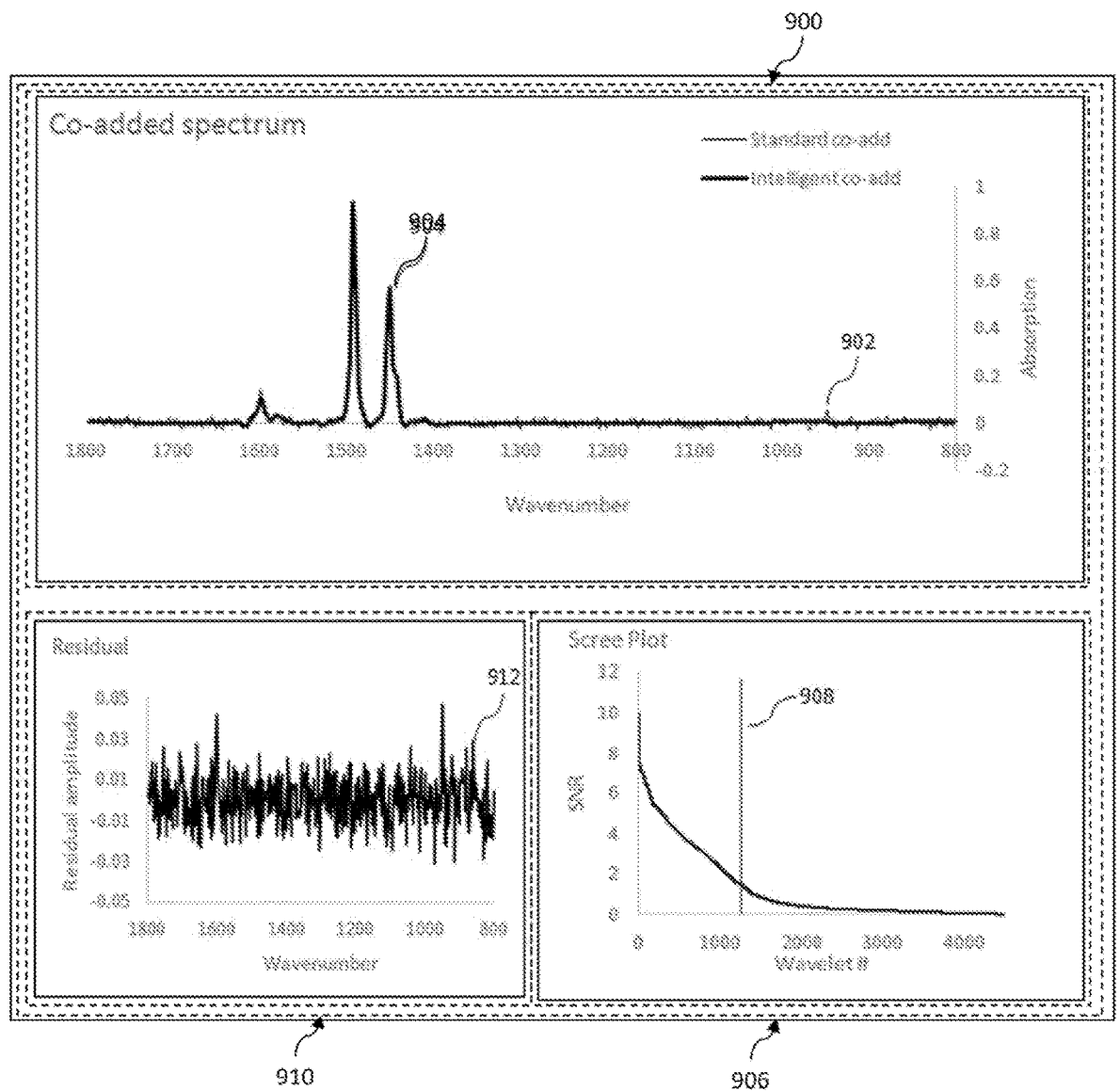
Figure 9D:
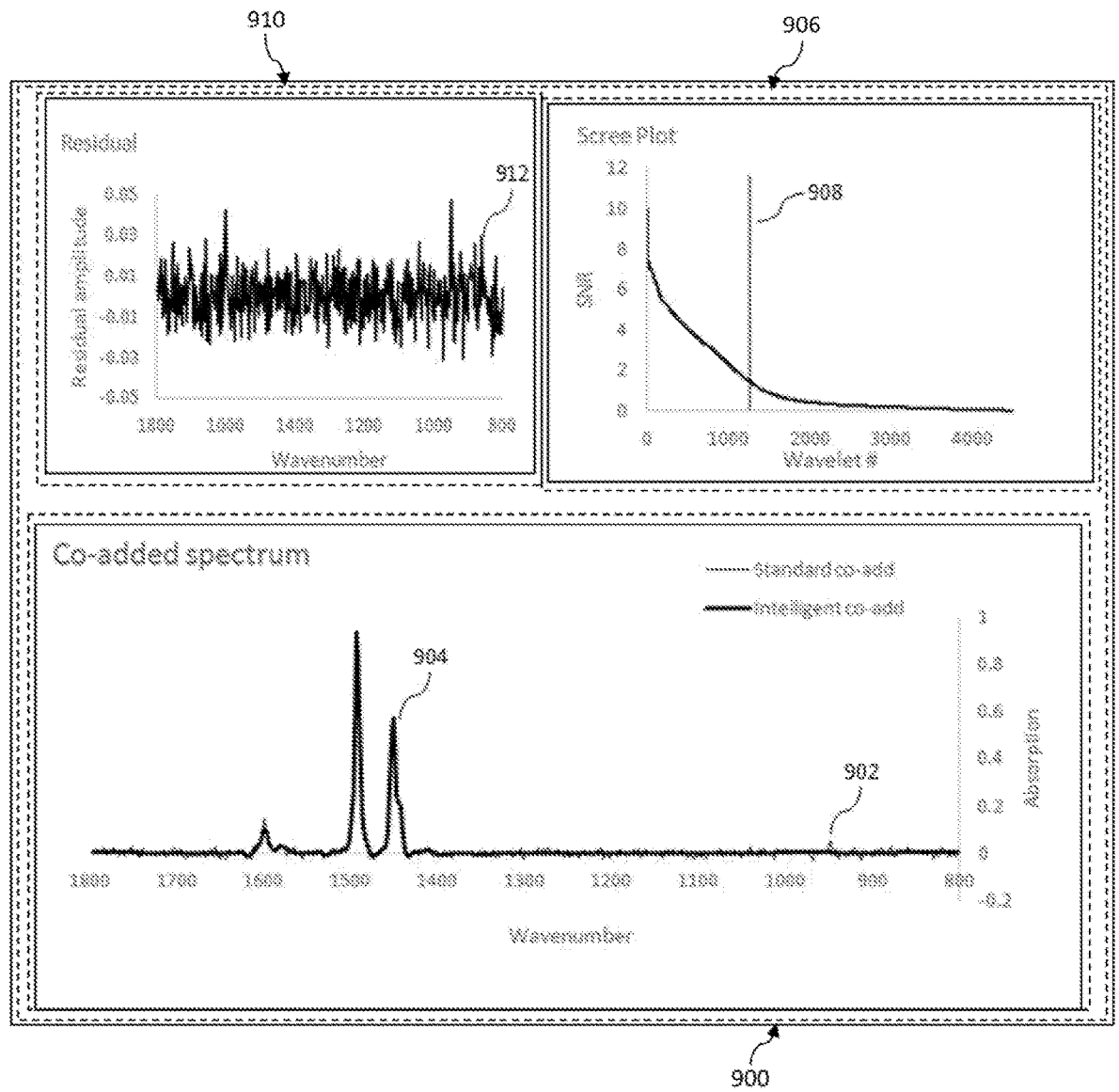
Figure 9E:
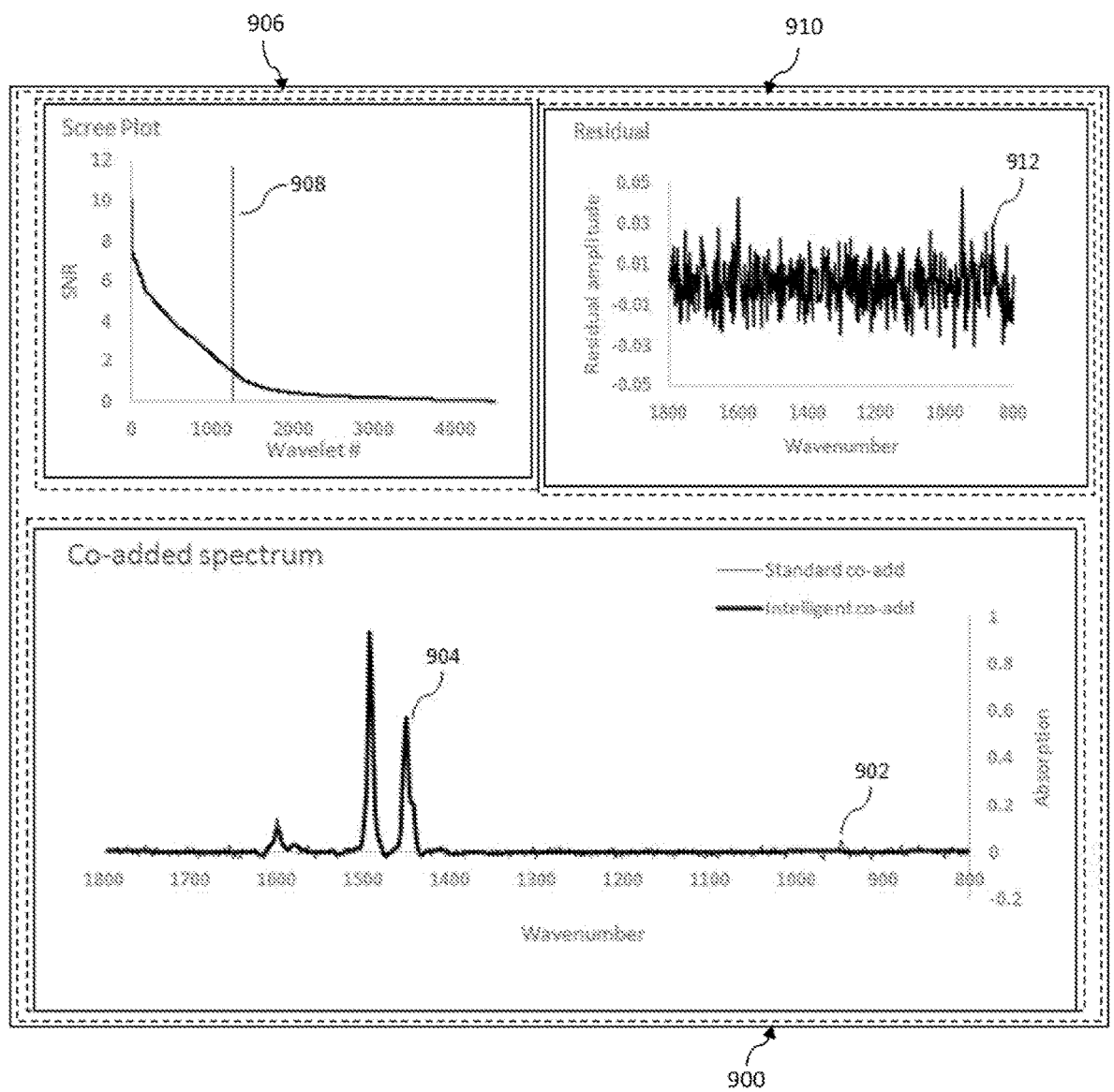

FIGS. 9C-9E show alternative graphical user interfaces in which the arrangement of the individual portions of the screen are permutated. In general, panel 900 will be larger than the panels 906 and 910, and will primarily extend in the horizontal direction. However, as indicated by dashed lines, the exact spacing between the particular panels on a screen, as well as their particular orientation relative to one another, need not be exactly as shown in FIGS. 9A-9E. It should also be understood that while each embodiment in FIGS. 9A-9E shows a solid-line cursor 908, in alternative embodiments as described above there need not be a cursor 908 whatsoever. Rather, in some embodiments the cursor 908 is absent, or it may be set by a machine learning algorithm. In embodiments other displays on a graphical user interface can permit a user to set the position of cursor 908.

The process described herein can be implemented as an improvement over conventional co-adding on infrared spectrometers. Examples of infrared spectrometers are illustrated in FIG. 10A-10C. FIG. 10A shows a simplified schematic diagrams of a Fourier Transform Infrared (FTIR) spectrometer. In this arrangement, an IR source 1002 emits a beam that is divided by beam splitter 1004 onto two paths, one towards a moving mirror 1006 and another towards a fixed mirror 1008. The IR beams are recombined at the beam splitter and directed towards a sample 1010. Light that passes through the sample is detected by detector 1012. The moving mirror 1006 is moved through a series of positions to create an interferogram and a processor is typically used to convert the interferogram into an infrared spectrum of the sample. Many different variations of FTIR spectrometer exist, as well as many accessories, including those for attenuated total reflection (ATR), grazing angle incidence, various probes for measuring reflectance instead of transmission/absorption, etc.

FIG. 10B shows an example of an infrared spectrometer microscope, which is a combination of an IR spectrometer with microscope optics. In the embodiment shown in FIG. 10B, IR light 1012 is focused by an objective 1014 onto a sample 1016 to measure the IR absorbing properties of localized regions of a sample 1016. These properties can be measured in transmission as shown by using a collector 1018 to collect light transmitted through the sample to an IR detector 1020. Alternately, reflected/scattered light can be recollected by objective 1014 and measured with an alternate/additional reflection mode detector (not shown). The IR light can come from an FTIR (as shown in FIG. 10A) or also from a narrow band IR light source like a quantum cascade laser. In either case, a processor 1022 is typically used to analyze the IR detector signal to create IR spectra.

FIG. 10C shows an example of an optical photothermal infrared spectrometer microscope. In this case both IR light 1024 and visible light 1032 is focused onto a sample 1030 using one or more objectives 1028. In the configuration shown IR light passes through a dichroic mirror 1026 and visible light is reflected off dichroic 1026, though this configuration can also be reversed. IR light absorbed by the sample causes a temperature increase in the sample that can change the amount and distribution of visible probe light reflected from and/or transmitted through the sample. In the configuration shown, visible light that is reflected/scattered from the sample 1030 is recollected by objective 1028, reflected off dichroic 1026, and then directed by beamsplitter 1034 towards visible detector 1036. Alternately the visible light can be collected in a transmission configuration by a collector under the sample, similar to collected 1028 in FIG. 10B. The amplitude of the modulation of the probe light can be an indicator of the amount of IR absorption by the sample. Processor 1038 can be used to construct a spectrum of IR absorption by the sample. The optical photothermal infrared spectrometer can have a spatial resolution limited by the wavelength of the probe beam, not the wavelength of the infrared radiation. Using a visible wavelength probe beam, for example a visible laser (e.g., at 480 nm 532 nm, 633 nm or other wavelengths), or even a near IR laser like a 785 nm laser, it is possible to achieve measure and map the infrared absorption of the sample with sub-micron spatial resolution.

In each of these cases 10A-10C, intelligent co-averaging can be applied by implementing the process described herein on the processors shown (1013, 1022, and 1038) or alternately on another processor.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A method of spectroscopically measuring an attribute of a sample, the method comprising:
   a) illuminating the sample with a beam of infrared (IR) radiation;
   b) using a spectrometer to measure the attribute at a location on the sample a plurality of times to obtain a plurality of IR spectrum measurements;
   c) using a processor to decompose each of the plurality of IR spectrum measurements into a series of transform basis functions and associated transform basis amplitudes and determine a signal content figure of merit for each of the series of transform basis functions;
   d) determining a threshold signal content figure of merit used to select a subset of the transform basis functions;
   e) using a processor to attenuate the transform basis amplitudes corresponding to the subset of the transform basis functions to generate an altered set of transform basis amplitudes; and
   f) using a processor to reconstruct a noise-reduced IR spectrum for the location on the sample based on the altered set of transform basis amplitudes.

2. The method of claim 1 comprising producing a ranking plot of signal content figures of merit that is used by a human operator to select the figure of merit threshold.

3. The method of claim 1 wherein the signal content figure of merit threshold is determined automatically without user intervention.

4. The method of claim 3 where the signal content figure of merit threshold is determined by analyzing a residual difference between a conventionally co-added spectrum and the denoised spectrum.

5. The method of claim 3 where the signal content figure of merit threshold is determined by analyzing noise content in the noise-reduced IR spectrum.

6. The method of claim 3 where the signal content figure of merit threshold is determined using a machine learning algorithm.

7. The method of claim 1 wherein the reconstruction step f is repeated a plurality of times at different values of the signal content figure of merit threshold to create a plurality of de-noised spectra and wherein a final de-noised spectrum is selected based on analysis of the plurality of noise-reduced IR spectra.

8. The method of claim 7 further comprising the step of identifying an optimal value of the signal content figure of merit threshold.

9. The method of claim 8 comprising determining the optimal value of the signal content figure of merit at a first location on the sample and repeating steps a-f of claim 1 at a plurality of additional locations on the sample while using the optimal value of the signal content figure of merit for reconstructing noise-reduced IR spectra at the plurality of additional sample locations.

10. The method of claim 1 where the transform basis functions comprise wavelets.

11. The method of claim 1 wherein a signal to noise ratio (SNR) of the noise-reduced IR spectrum has a higher SNR than if calculated by conventional co-adding of the plurality of spectra.

12. The method of claim 11, wherein the SNR of the noise-reduced IR spectrum is at least two times greater than the SNR calculated by conventional co-adding of the plurality of spectra.

13. The method of claim 12, wherein the SNR of the noise-reduced IR spectrum is at least ten time greater than the SNR calculated by conventional co-adding of the plurality of spectra.

14. The method of claim 1, wherein the plurality of IR spectrum measurements comprise a quantity N of IR spectrum measurements, and wherein the noise-reduced spectrum has a signal to noise ratio ($SNR_{NR}$) that is greater than $SNR_0/SQRT(N)$, where $SNR_0$ is a signal to noise ratio of a single IR spectrum of the plurality of IR spectrum measurements, and SQRT represents the square root function.

15. The method of claim 1, wherein the spectrometer is a photothermal infrared spectrometer.

16. The method of claim 15, wherein the photothermal infrared spectrometer has a spatial resolution of less than 1 micron.

17. The method of claim 1, wherein the the noise reduced spectrum has a signal to noise of greater than 1000 with 20 or fewer co-adds.

18. A system comprising:
an infrared source configured to direct a beam of infrared light towards a region of a sample;
an infrared spectrometer configured to detect an interaction between the beam of infrared light and the region, wherein the infrared spectrometer is configured to detect the interaction at the region of the sample multiple times to generate a plurality of infrared spectra;
a processor configured to intelligently co-add the infrared spectra by:
decomposing each infrared spectrum of the plurality of infrared spectra into a plurality of transform basis functions and associated transform basis function coefficients;
determining a signal content figure of merit for each of the plurality of transform basis functions;
altering the associated transform basis function coefficients by attenuating a subset of the coefficients using the signal content figures of merit; and
reconstructing a noise-reduced spectrum using the altered transform basis function coefficients.

19. The system of claim 18, further comprising a display configured to output one of the group consisting of an intelligently co-added spectrum corresponding to the sample or an identification of a chemical composition of the sample.

20. A sample characterization system comprising:
an infrared spectrometer configured to provide a plurality of infrared spectra data taken from a common sample location;
a transform module configured to intelligently co-add the plurality of infrared spectra data by representing each infrared spectrum of the plurality of infrared spectra data as a plurality of transform basis functions;
a merit determination module configured to determine a signal content figure of merit for each of the plurality of transform basis functions from the transform module;
an attenuation and reconstruction module configured to adjust a threshold for sorting by signal content figure of merit prior to reconstruction of the plurality of basis functions such that:
for each of a subset of attenuated basis functions that has a signal content figure of merit below the threshold, the subset of attenuated basis functions is attenuated by a factor corresponding to the corresponding one of the signal content figures of merit,
for each of a subset of non-attenuated basis functions that has a signal content figure of merit above the threshold, none of the subset of non-attenuated basis functions is attenuated, and
a machine learning function configured to set the threshold based upon recognizable signal data in the subset of attenuated basis functions.

21. The sample characterization system of claim 20, wherein the machine learning function is trained to adjust the threshold between the subset of attenuated basis functions and the subset of non-attenuated basis functions based upon training data provided by a user.

* * * * *